US012789600B2

(12) United States Patent
Michailidis

(10) Patent No.: US 12,789,600 B2
(45) Date of Patent: Nov. 10, 2026

(54) COVER ASSEMBLY FOR TRUCK BED

(71) Applicant: GI.ANSO 4X4 CLUB, S.A., Elefsina-Attikis (GR)

(72) Inventor: Athinodoros Michailidis, Elefsina-Attikis (GR)

(73) Assignee: GI ANSO 4X4 CLUB SA, Elefsina (GR)

( * ) Notice: Subject to any disclaimer, the term of this patent is extended or adjusted under 35 U.S.C. 154(b) by 85 days.

(21) Appl. No.: 18/995,241

(22) PCT Filed: Jul. 5, 2023

(86) PCT No.: PCT/EP2023/068559
§ 371 (c)(1),
(2) Date: Jan. 16, 2025

(87) PCT Pub. No.: WO2024/017643
PCT Pub. Date: Jan. 25, 2024

(65) Prior Publication Data

US 2026/0014840 A1 Jan. 15, 2026

(30) Foreign Application Priority Data

Jul. 18, 2022 (EP) .................................... 22185538

(51) Int. Cl.
*B60J 7/04* (2006.01)
*B60J 7/057* (2006.01)
*B60Q 1/30* (2006.01)
*B60R 16/02* (2006.01)

(52) U.S. Cl.
CPC ............. *B60J 7/041* (2013.01); *B60J 7/0573* (2013.01); *B60Q 1/307* (2013.01); *B60R 16/0215* (2013.01); *B60Y 2400/30* (2013.01)

(58) Field of Classification Search
CPC . B60J 7/041; B60J 7/0573; B60J 7/085; B60J 7/141; B60Q 1/307; B60R 16/0215
USPC ............ 296/100.03, 100.08, 100.09, 136.03
See application file for complete search history.

(56) References Cited

U.S. PATENT DOCUMENTS

| | | | | |
|---|---|---|---|---|
| 2008/0203756 | A1* | 8/2008 | Lake | B60P 7/02 296/100.08 |
| 2016/0236549 | A1 | 8/2016 | Stewart | |
| 2016/0257256 | A1 | 9/2016 | Flothmann | |
| 2018/0118002 | A1 | 5/2018 | Koengeter | |
| 2018/0339581 | A1* | 11/2018 | Rossi | B60J 7/141 |
| 2019/0054809 | A1* | 2/2019 | Bernardo | B60J 7/085 |

(Continued)

FOREIGN PATENT DOCUMENTS

WO WO-2025212083 A1 * 10/2025 .............. B60J 10/60

*Primary Examiner* — Wenwei Zhuo
(74) *Attorney, Agent, or Firm* — Sisson & Banyas, Attorneys at Law, LLC; Jeffrey J. Banyas

(57) ABSTRACT

A cover assembly has a housing box, a rollable curtain, a shaft, and cable guiding elements. The rollable curtain has adjacent transverse panels continuously connected along their transverse length. The shaft is mounted to undergo rotation for winding and unwinding the rollable curtain on the shaft. The cable guiding elements are configured to receive cable wires therethrough for providing a wired connection between electrical elements arranged on the rollable curtain and stationary elements of the housing box so that the cable wires are supported and guided along at least one longitudinal length of the rollable curtain during winding and unwinding of the rollable curtain.

14 Claims, 8 Drawing Sheets

(56) References Cited

U.S. PATENT DOCUMENTS

| | | | | |
|---|---|---|---|---|
| 2020/0353803 | A1 | 11/2020 | Pompili | |
| 2021/0155086 | A1 * | 5/2021 | Pattabhiraman | B60J 7/041 |
| 2022/0199283 | A1 * | 6/2022 | Kawaguchi | H01B 7/0216 |
| 2023/0053274 | A1 * | 2/2023 | Kober | B60J 7/068 |
| 2023/0398845 | A1 * | 12/2023 | Chen | B60L 8/003 |
| 2025/0026416 | A1 * | 1/2025 | Loudon | B62D 33/04 |
| 2026/0034870 | A1 * | 2/2026 | Michailidis | B60J 7/041 |

* cited by examiner

COVER ASSEMBLY FOR TRUCK BED

RELATED APPLICATIONS

This application is a national stage application under 35 U.S.C. § 371 of International Patent Application No. PCT/EP2023/068559, filed on Jul. 5, 2023 and published as WO 2024/017643 on Jan. 25, 2024, which claims priority to European Patent Application No. 22185538.0, filed Jul. 18, 2022, which are all hereby incorporated by reference in their entirety.

FIELD OF THE INVENTION

The invention relates to a cover assembly for the truck bed of a pick-up type vehicle, and in particular to a cover assembly comprising a rollable curtain and a plurality of cable guiding elements for supporting and guiding cable wires during winding and unwinding of the curtain, to provide a wired connection between stationary and moving or rolling elements.

BACKGROUND

Truck bed covers are commonly used with pick-up trucks and like vehicles with cargo areas that are substantially exposed. There are known different types of covers (roll-up covers, folding covers, retractable covers, one-piece solid covers, etc.) for providing a more secure, weather-protected storage.

The design and use of retractable roll-up truck bed covers with open bed pickup trucks is well known. Conventional retractable roll-up truck bed covers commonly include a rollable curtain formed of a plurality of individual slats hingedly connected to form a slat array. The hinged connection of individual slats enables the slat array to form a continuous cover that, once mounted in a pair of side rails, can be either completely or partially extended or retracted and stored in a rolled-up configuration inside a housing box.

Covers, and particularly roll-up covers, comprise moveable and rollable elements and sometimes it is desirable to provide an electric wired connection to said elements i.e., to power light fixtures, to communicate with sensors, etc.

Roll-up covers including an electric wired connection mounted by running a plurality of cable wires in the side rails comprised within the roll-up covers are known.

However, due to the moveable/rollable aspect of the curtain of the roll-up covers, wired side rails of said covers are not able to provide a continuous connection between electric elements arranged on the rollable curtain and stationary elements, with respect to the housing box of the cover or with respect to the vehicle, while the curtain is operable, i.e., in movement.

Therefore, there remains a need for a cover assembly and more precisely a roll-up cover, to be able to provide a wired connection and allow power to be provided to moving parts of the cover, and more precisely to parts of the roll-up cover curtain, to be used for multiple purposes, such as for effectively illuminating portions or the entire length of the truck bed, for including light signals, either decorative or functional, sensors, electric actuators, etc.

SUMMARY OF THE INVENTION

In accordance with the invention a cover assembly for a pickup truck bed is provided. The cover assembly comprises a rollable curtain for selectively extending to at least partially cover the pickup truck bed and at least partially retracting to form a roll to be stored inside a housing box. The rollable curtain is formed of a plurality of adjacent transverse panels or slats that are hingedly connected to one another and an end slat.

According to an aspect of the invention, a plurality of cable guiding elements are mounted to at least part of the plurality of adjacent transverse panels for supporting and guiding cable wires in a defined manner during winding and unwinding of the curtain in such a manner that as the curtain is extended over the pickup truck bed the cable wires are guided and supported, without stretching, along at least one portion of the transverse panels and as the flexible cover is retracted the cable guiding elements guide and support the cable wires to form part of the roll, in an orderly manner, such that upon winding of the curtain the cable wires are wound in a circular manner without bending.

Hence, the cable guiding elements are designed to avoid stretching or bending of the cable when the cable is wound (rolled) in the housing box and/or when the cover is extended.

The cable guiding elements are configured to receive cable wires therethrough, from a stationary part of the cover assembly (i.e., parts mounted on the housing box) to different movable or rollable parts of the movable or rollable curtain (i.e., parts mounted on the rollable curtain, transverse panels, end slat) while protecting the cable wires from external damage, minimizing abrasion of the cables and avoiding bending of the cables when the curtain is wound.

According to another aspect of the invention, the cover assembly comprises a light source arranged on one or more of the plurality of adjacent transverse panels, for effectively illuminating the truck bed of a pick-up type vehicle.

According to a further aspect of the invention, the cover assembly may also comprise, arranged on the plurality of adjacent transverse panels and/or the end slat, light signals or sensor-means (pressure sensor-means, light sensor-means, extra brake lamp, emergency lamp, obstacle sensors, interior lamps etc.) that may be powered by means of the cable wires.

Additional objects and advantages of the invention will become apparent to those skilled in the art upon reference to the detailed description taken in conjunction with the provided figures.

BRIEF DESCRIPTION OF THE DRAWINGS

Non-limiting examples of the present disclosure will be described in the following, with reference to the appended drawings, in which.

DETAILED DESCRIPTION OF THE INVENTION

Figures 1A, 1B:
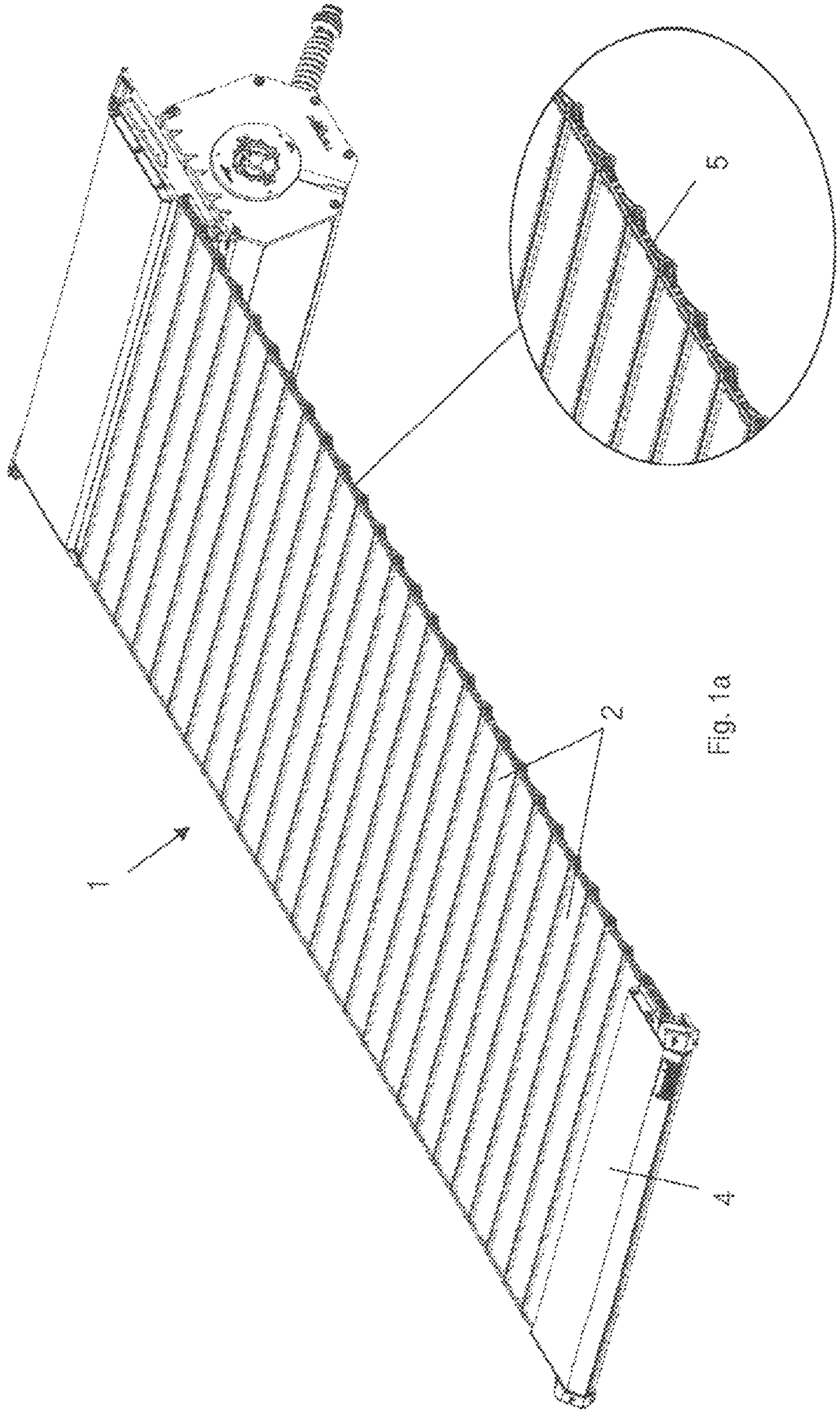
FIG. 1*a* shows a fully extended cover assembly according to an embodiment of the invention.
FIG. 1*b* is a detailed view of part of the cover assembly of FIG. 1*a*, showing the cable guiding elements according to one embodiment of the invention.

With reference to FIG. 1*a*, a cover assembly for the truck bed of a pick-up type vehicle according to the invention comprises a rollable curtain 1 formed of a plurality of adjacent transverse panels 2, which are continuously connected along their transverse length by hinge joints 3, and an end slat 4, said rollable curtain 1 coupled at one end to a transverse rotatable shaft, comprised within a housing box 21, to allow winding and unwinding thereon.

The cover assembly further comprises a plurality of cable guiding elements 5, as shown in FIG. 1*b*, mounted to at least part of the plurality of the adjacent transverse panels 2 and configured to receive cable wires therethrough for providing a wired connection to the rollable curtain 1, such that the cable wires can be supported and guided in a defined manner along at least one longitudinal length of the rollable curtain 1 during winding and unwinding of the later, providing a wired connection between elements (17, 18, 19) arranged on individual transverse panels 2 and/or the end slat 4 and stationary elements, i.e. elements mounted on the housing box 21 of the cover assembly.

The term longitudinal is to be understood as a direction parallel to a travel direction of the vehicle.

The term transverse is to be understood as a direction transverse to a travel direction of the vehicle.

The term cable wire is to be understood as any type of cable designed for applications ranging from transmission of data to power supply, such as USB cables, single wire cables, multi-wire cables, coaxial cables, transmission cables, optical-fiber cables, etc.

In a preferred embodiment of the present invention, as shown in FIGS. 4 and 6 to 12 in addition to FIGS. 1*a* and 1*b*, each one of the plurality of adjacent transverse panels 2 has a cable guiding element 5 mounted to one or both of its longitudinal ends. In this manner cable wires can either be arranged along only one longitudinal side of the rollable curtain 1 or along both opposed longitudinal sides of the rollable curtain 1, allowing for different cable routing arrangements.

Figure 5:
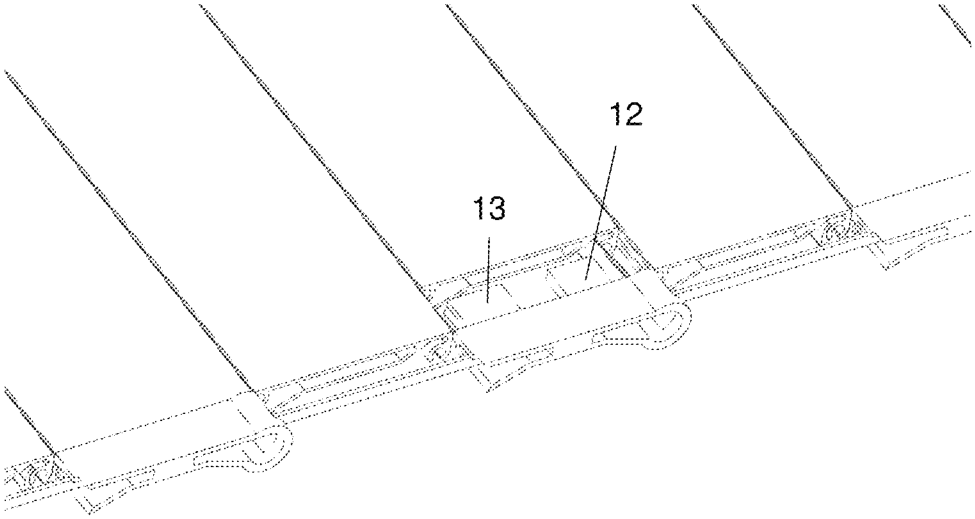
FIG. 5 is a partial top perspective view of the cover assembly according to another embodiment of the present invention.

Alternatively, the cable guiding elements 5 may be mounted to only part of the plurality of adjacent transverse panels 2, to one or both of its longitudinal ends, as shown in FIG. 5.

In one embodiment of the present invention, adjacent transverse panels 2, may have a cable guiding element 5 mounted to opposed longitudinal ends, respectively.

In other embodiments, the cable guiding elements 5 may be mounted or attached at an interior position of the adjacent transverse panels 2 or may be integrated in the design of the transverse panels 2.

A number of suitable configurations for the guiding elements 5 are contemplated.

Contemplated configurations are particularly suitable for receiving cable wires therethrough, allowing cable wires to be wound in the housing box 21, along with the rollable curtain 1, in a circular manner without stretching and avoiding bending of the wires when the rollable curtain 1 is extended.

Figure 2:
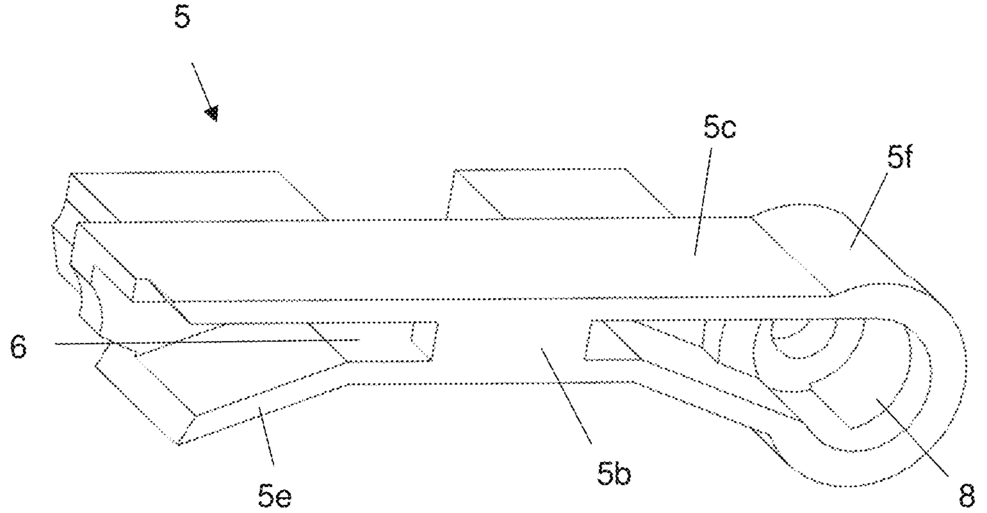
FIG. 2 is a front perspective view of a cable guiding element according to an embodiment of the present invention.
Figure 3:
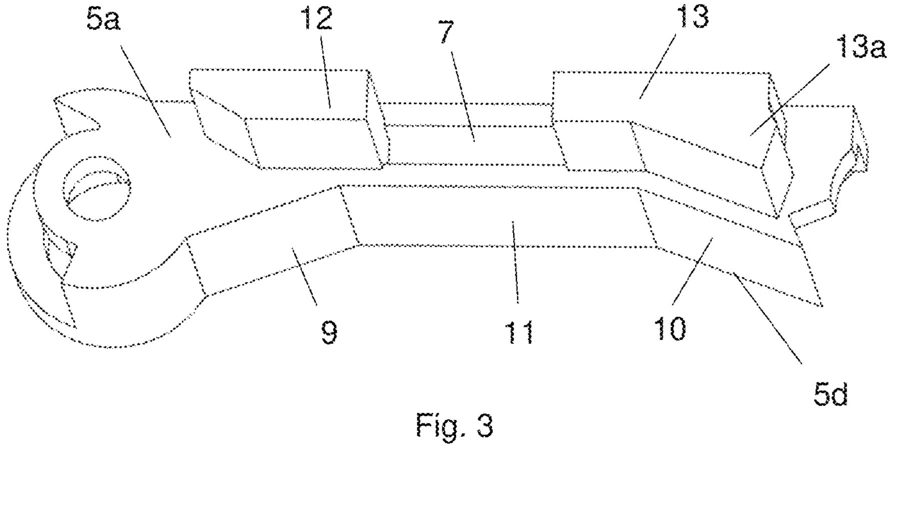
FIG. 3 is a back perspective view of the cable guiding element of FIG. 2.
Figure 4:
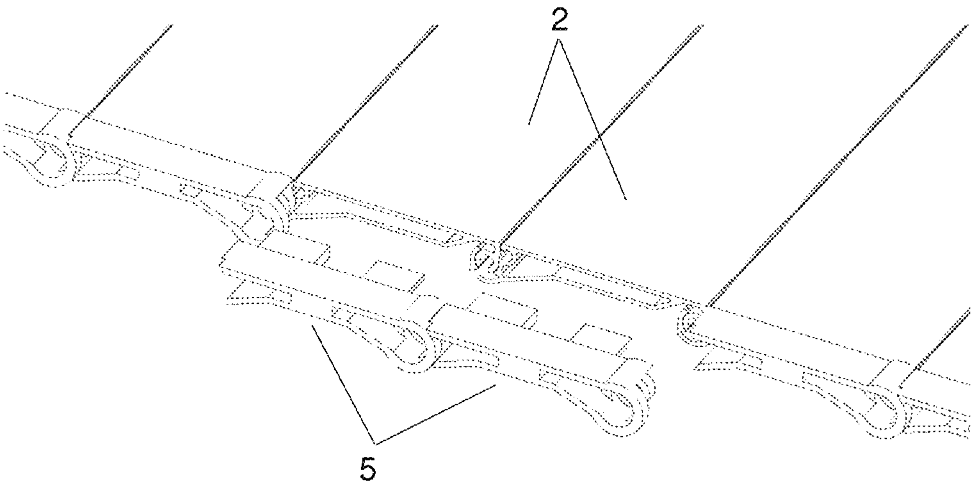
FIG. 4 is a partial top perspective view of the cover assembly according to one embodiment of the present invention.

In the illustrated configurations, the cable guiding elements 5 comprise an inner wall 5*a*, an outer wall 5*b*, a top wall 5*c*, a bottom wall 5*d*, a distal end 5*e* and a proximal end 5*f* defining a through channel 6 over the entire length of the cable guiding elements 5 for cable wires to be supported and guided as they pass longitudinally through the cable guiding elements 5, as shown in FIGS. 2 and 3.

The cable guiding elements 5 are arranged on the rollable curtain 1 in assembled relation such that the proximal end 5*f* of a cable guiding element 5 faces the distal end 5*e* of a consecutive cable guiding element 5, whether the consecutive guiding element 5 is mounted to an adjacent panel 2 or mounted to a further removed transverse panel 2, as shown in FIGS. 4 to 11.

The distal ends 5*e* of the cable guiding elements 5 have a design functionally corresponding to the design of the proximal ends 5*f*, such that when in assembled relation, during winding and unwinding of the rollable curtain 1, the distal end 5*e* of a cable guiding element 5 functionally corresponds to the proximal end 5*f* of a consecutive cable guiding elements 5 to avoid bending of cable wires when the cover is extended and allow winding of the cable wires without stretching.

In one of many equally preferable configurations, the, the distal end 5*e* and/or the proximal end 5*f* of the cable guiding elements 5 is open-ended.

In the preferred embodiment of FIGS. 2 and 3, the distal end 5*e* is open-ended and the proximal end 5*f* comprises a generally curved portion with an opening 8.

In another equally preferable configuration, the outer wall 5*b* extends partially along the longitudinal length of the guiding element 5, preventing cable wires from slipping out the through channel 6.

Figure 11:
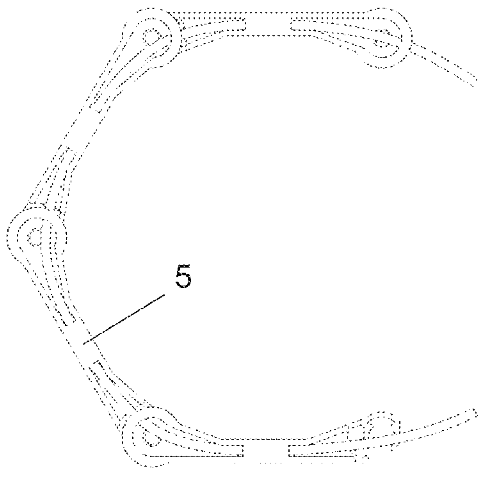
FIG. 11 is a partial side perspective view of the cover assembly in a wound position, including a cable wire.
Figure 12:
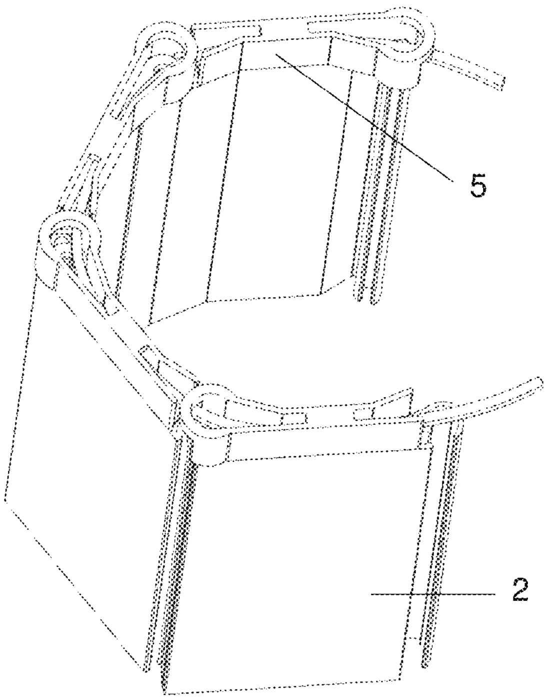
FIG. 12 is a partial side view of the cover assembly in a wound position, including a cable wire.

The cable guiding elements 5 have a heigh at its proximal and distal ends 5*f*, 5*e* greater than the height at the center of the guiding elements 5, such that the through channel 6 increases in height towards its ends allowing cable wires to be wound in a circular manner without bending, as shown in FIGS. 11 and 12.

In the illustrated embodiments of FIGS. 2 and 3, the bottom wall 5*d* comprises two diagonal segments 9, 10 connected to the respective ends of horizontal segment 11, however, other possible configurations of the bottom wall 5*d* are also contemplated, the bottom wall 5*d* may have a curve-shaped configuration, for example.

Figure 10:
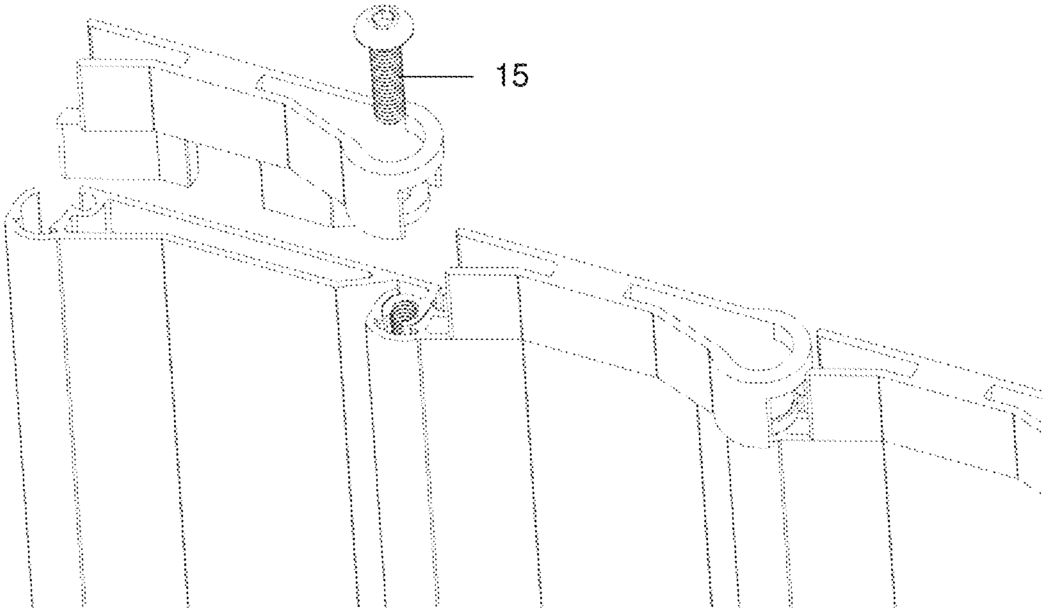
FIG. 10 is a partial exploded view of part of the cover assembly according to an embodiment of the present application.

The cover assembly comprises means 15, for attaching the cable guiding elements 5 to the adjacent transverse panels 2. The means for attaching the cable guiding elements 5 to the adjacent transverse panels 2 may be a threaded bolt or fastener 15, as shown in FIG. 10, or any other suitable attaching means or combination thereof.

Figure 15:
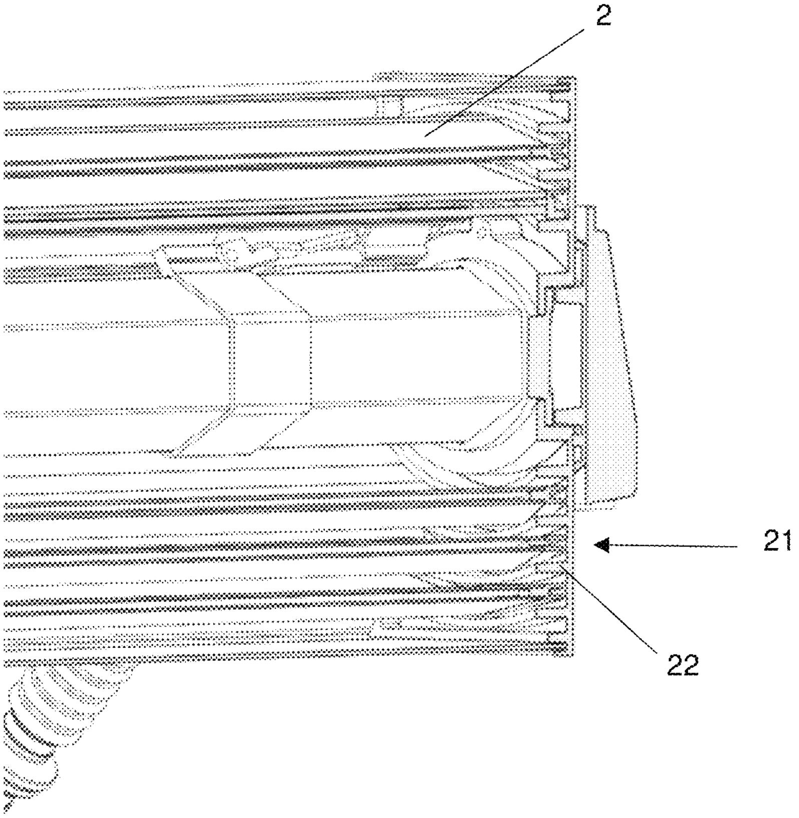
FIG. 15 is a cross sectional front view of a housing box in accordance with an embodiment of the present invention, wherein the rollable curtain is in a fully retracted position.

In another embodiment, the housing box 21 may comprise helical trackways 22 arranged on an inner surface of the side walls thereof, as shown in FIG. 15, to help guide the rollable curtain 1 free of excessive frictional resistance upon extending or retracting the same. In such an embodiment, the cable guiding elements 5 may comprise a ball bearing 16 to minimize the rolling friction between the transverse panels 2 and the helical trackways 22.

Figure 6:
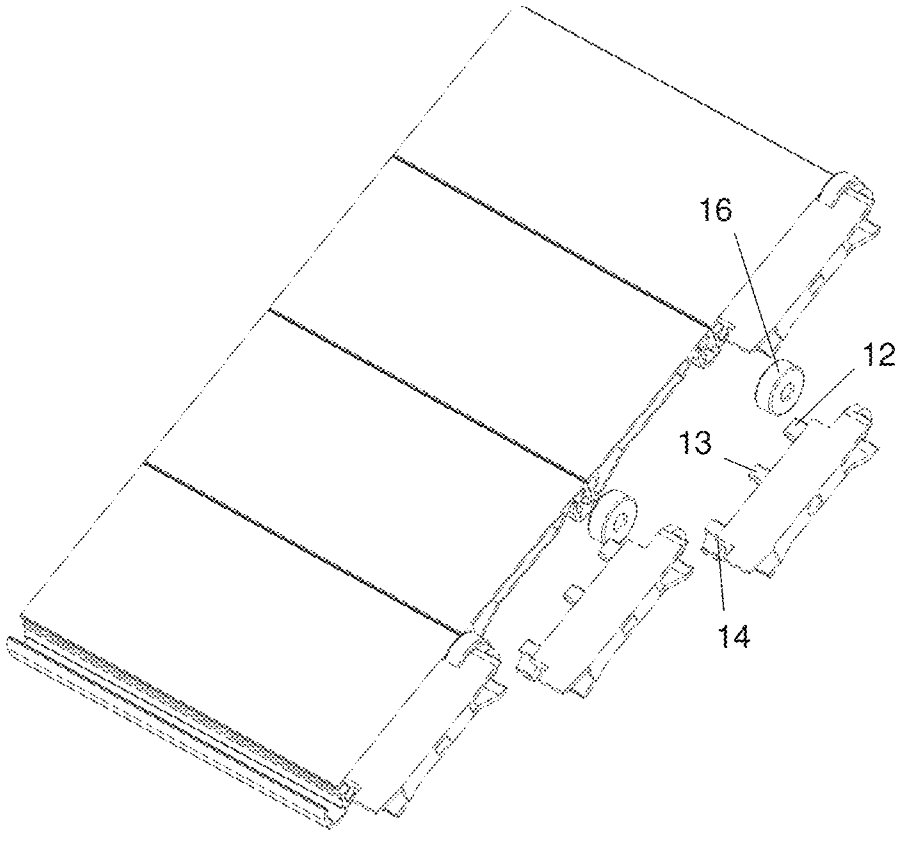
FIG. 6 is a partial exploded top view of the cover assembly according to an embodiment of the present invention.
Figure 7:
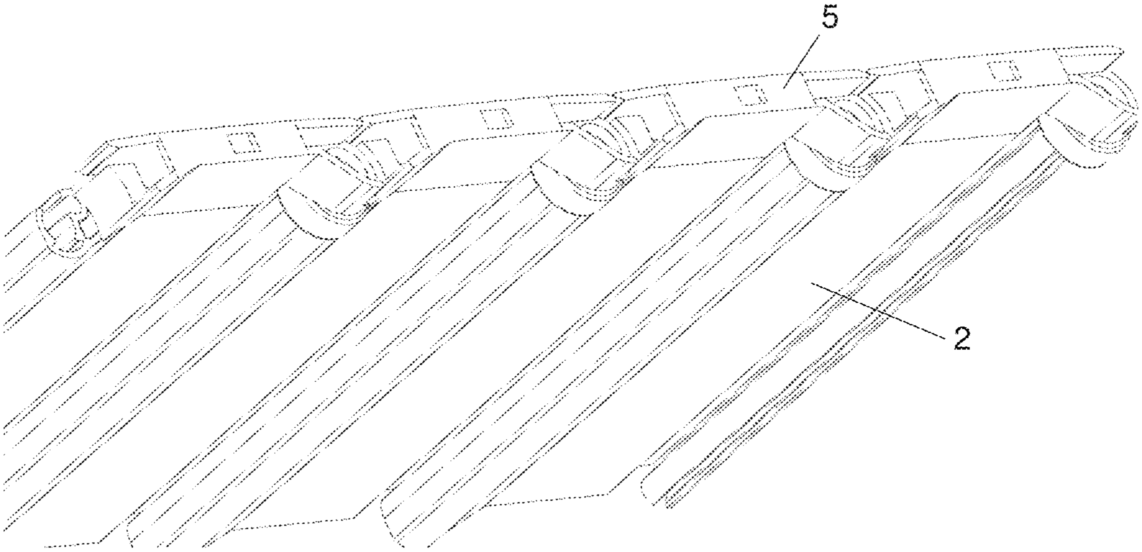
FIG. 7 is a partial bottom perspective view of the cover assembly according to an embodiment of the present invention.
Figure 8:
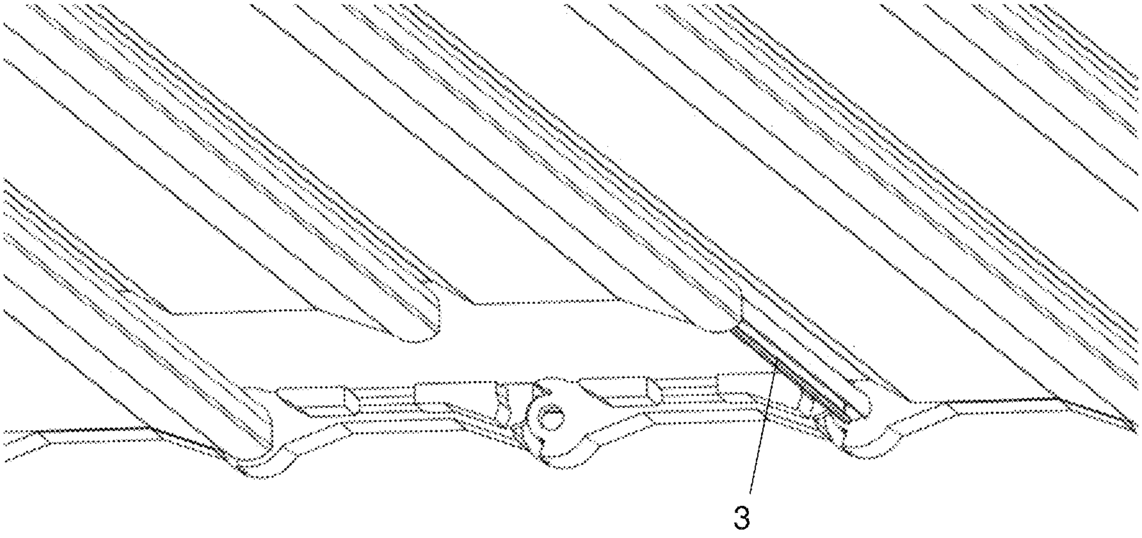
FIG. 8 is a partial exploded bottom perspective view of the cover assembly according to an embodiment of the present invention.
Figure 9:
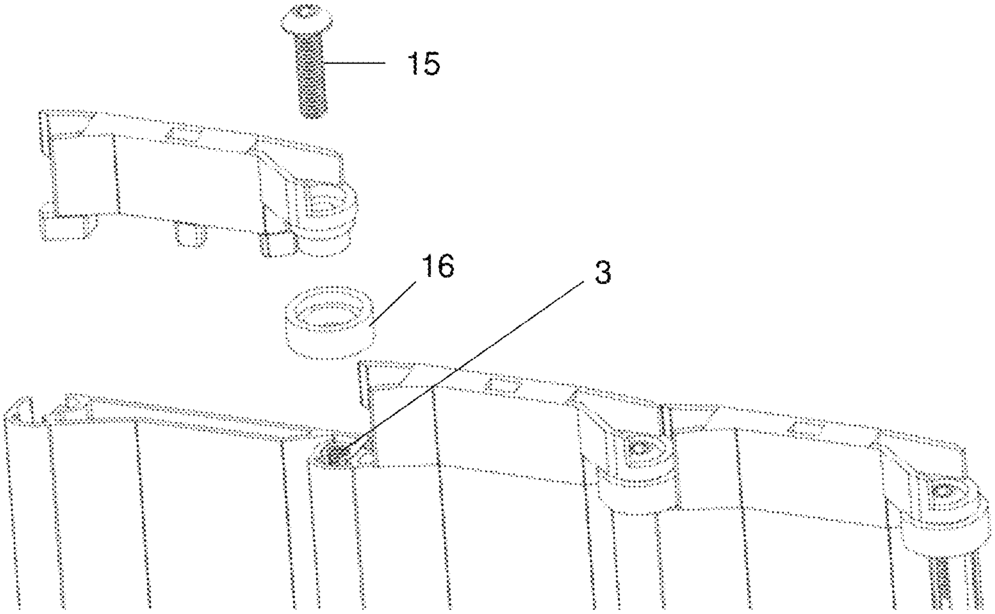
FIG. 9 is a partial exploded view of part of the cover assembly according to an embodiment of the present application.

The cable guiding elements 5 may also comprise a plurality of transversely projecting parts 12, 13, 14, as shown in FIGS. 3 and 6, which extend inside the transverse panels 2 for providing additional attaching means. That is, the cable guiding elements 5 may have a design profile corresponding to the design profile of the transverse panels 2 for better fit.

Transversely projecting parts 12, 13, 14 may vary in configuration, number, arrangement, etc.

With specific reference to FIGS. 2 and 3, the inner wall 5*a* of the cable guiding elements 5 may comprise a passageway 7 through which cable wires can be passed out of the through channel 6 laterally with respect to the cable guiding element 5 to provide a wired connection to elements mounted on to the transverse panel 2 to which the cable guiding element 5 is mounted to.

Figure 13:
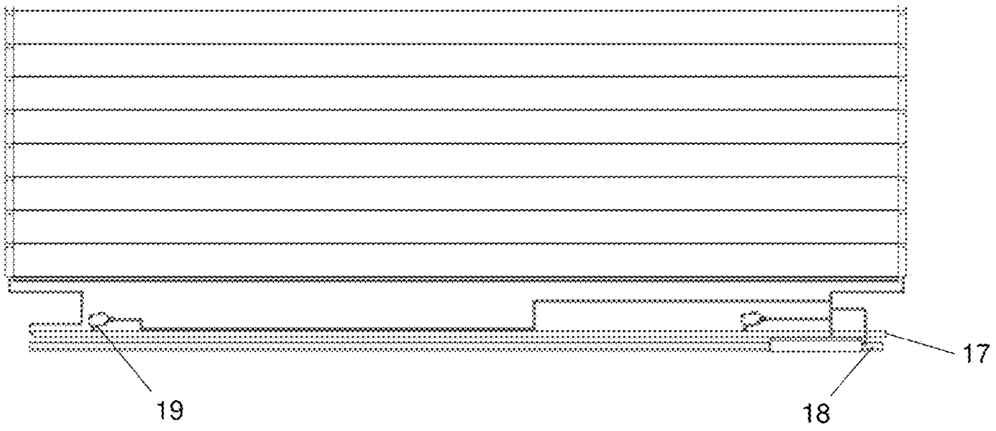
FIG. 13 is a partial top view cover assembly of the cover system according to one embodiment of the present invention wherein the end slat comprises a light signal and sensor-means.

In an embodiment of the present invention, light sources 17, 18, shown in FIG. 13, may be arranged on one or more of the plurality of adjacent transverse panels 2 and oriented to direct light into the interior and/or exterior of a truck bed and may be configured for operation by dedicated switches, may be automatically operated upon deployment of the rollable curtain 1, may be remotely controlled or may also operate in conjunction with the headlights, parking lights or tail lights of the vehicle.

Alternatively, light sources 17, 18 can further be activated by a light sensor-means, not shown, upon the happening of a selected event, such as at darkness, dusk, or times of severe weather conditions, for example.

Light sources 17, 18 may be a single component or may consist of a plurality of lighting elements selectively positioned along the length of one or more of the plurality of adjacent transverse panels 2 and the end slat 4.

In a further embodiment of the present invention, as shown in FIG. 13, sensor-means 19 may be arranged in the end slat 4, such that when the cover system is motor driven, the cover will automatically stop and reverse upon detecting an obstacle instance.

In a preferred embodiment of the invention, the light source is a red light 18 that can work as an extra brake light emitting a brake light signal, an emergency light or an extra driving beam light like the rest tailgate lights of the vehicle and/or a safety light during operation of the roll-up cover.

In other embodiments, the light sources 17, 18 may be illuminated when the vehicle and/or the roll-up cover is in operation.

Figure 14:
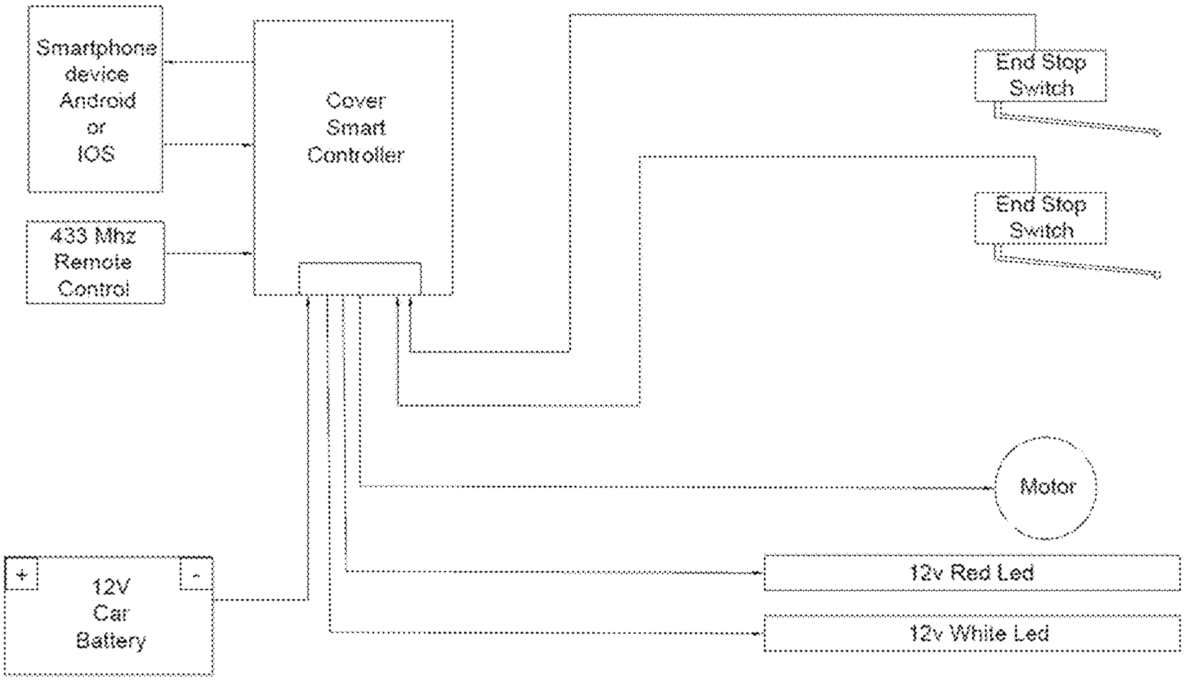
FIG. 14 shows a wiring diagram of the cover assembly according to an embodiment of the invention.

Said lights 17, 18 and sensor-means 19 may be connected to an electric source on the vehicle, such as the vehicle battery, by means of cable wires guided to specific transverse panels 2, through the passageway 7 of the corresponding cable guiding elements 5. The electrical source may be the car battery of the vehicle or other power sources and the control signals may be simple switches or a smart control board as shown in FIG. 14.

The above-described invention may incorporate additional circuitry to control the color and the brightness of the light sources 17, 18.

In addition, further circuity may be incorporated with any of the embodiments of the present invention to cause the lights 17, 18-to flash or vary in intensity, for example, as the rollable curtain 1 is in movement (opening or closing), when the vehicle brakes or accelerates, etc.

The end slat 4 may further comprise a lock mechanism, not shown, arranged on the end slat 4, for securing the rollable curtain 1 to the tailgate of the truck. Said locking mechanism comprising a handle for opening and closing the rollable curtain 1.

The cover system is configured to be remotely controlled, as shown in FIG. 14, by means of a remote-control element or a mobile application installed in a smartphone, or locally controlled by an end slat actuator.

In addition, a smart controller controls lights 17, 18 and any other electric elements arranged on the cover assembly, such as the electric motor, may receive signals from the sensors 19, adjust the brightness of the lights and control the lock mechanism.

While the embodiments have been described in detail in the description, the same is to be considered illustrative and not restrictive in character, being understood that it would be obvious to those skilled in the art that various other changes and modifications may be made without departing from the scope of the disclosure.

The invention claimed is:

1. A cover assembly for a truck bed of a pick-up type vehicle, the cover assembly comprising: a housing box; a rollable curtain formed by a plurality of adjacent transverse panels, which are continuously connected along their transverse length by hinge joints, and an end slat, the rollable curtain being coupled at one end to a rotatable transverse shaft to allow winding and unwinding thereon; and a plurality of cable guiding elements mounted to at least part of the plurality of adjacent transverse panels and/or the end slat and configured to receive cable wires therethrough for providing a wired connection between electrical elements arranged on the rollable curtain and stationary elements of the housing box such that the cable wires can be supported and guided in a defined manner along at least one longitudinal length of the rollable curtain during winding and unwinding of the rollable curtain, wherein the plurality of cable guiding elements comprise a plurality of transversely projecting parts which extend inside the transverse panels.

2. The cover assembly according to claim 1, wherein the electrical elements comprise one or more of a light source and/or a sensor arranged on part of the plurality of adjacent transverse panels or the end slat and connected by cable wires.

3. The cover assembly according to claim 1, wherein the electrical elements comprise a plurality of lighting elements selectively positioned along the length of the transverse panels and/or the end slat.

4. The cover assembly according to claim 1, further comprising means for attaching the guiding elements to the adjacent transverse panels and/or the end slat.

5. The cover assembly according to claim 1, wherein the housing box comprises helical trackways and each of the plurality of cable guiding element comprises a ball bearing to minimize the rolling friction between the transverse panels and the helical trackways.

6. The cover assembly according to claim 1, wherein each one of the plurality of adjacent transverse panels has a cable guiding element of the plurality of cable guiding elements mounted to one of its longitudinal ends.

7. The cover assembly according to claim 1, wherein each one of the plurality of adjacent transverse panels has a cable guiding element of the plurality of cable guiding elements mounted to both of its longitudinal ends.

8. The cover assembly according to claim 1, wherein the cable guiding elements comprise an inner wall, an outer wall, a top wall, a bottom wall, a distal end and a proximal end defining a through channel over the entire length of the cable guiding elements for cable wires to be supported and guided as they pass longitudinally through the cable guiding elements.

9. The cover assembly according to claim 8, wherein the outer wall extends partially along the longitudinal length of the guiding element preventing cable wires from slipping out the through channel.

10. The cover assembly according to claim 9, wherein the inner wall comprises a passageway through which a cable wire may be passed out of the through channel laterally with respect to the cable guiding element to provide a wired connection to electrical elements mounted on the transverse panel to which the cable guiding element is mounted to.

11. The cover assembly according to claim 8, wherein the distal end and/or the proximal end is open-ended.

12. The cover assembly according to claim 8, wherein the proximal end comprises a generally curved portion with an opening.

13. The cover assembly according to claim 8, wherein the bottom wall comprises two diagonal segments connected to the respective ends of horizontal segment.

14. The cover assembly according to claim 8, wherein the cable guiding elements are arranged on the rollable curtain in assembled relation such that the proximal end of one of the cable guiding elements faces the distal end of a consecutive one of the cable guiding elements.

* * * * *